United States Patent

Otto

[11] Patent Number: 5,975,652
[45] Date of Patent: Nov. 2, 1999

[54] ELECTROHYDRAULIC UNIT

[75] Inventor: Albrecht Otto, Schöneck, Germany

[73] Assignee: ITT Manufacturing Enterprises Inc., Wilmington, Del.

[21] Appl. No.: 09/051,902

[22] PCT Filed: Nov. 8, 1996

[86] PCT No.: PCT/EP96/04893

§ 371 Date: Jul. 20, 1998

§ 102(e) Date: Jul. 20, 1998

[87] PCT Pub. No.: WO97/18113

PCT Pub. Date: May 22, 1997

[30] Foreign Application Priority Data

Nov. 15, 1995 [DE] Germany .............. 195 42 582

[51] Int. Cl.⁶ ................................................ B60T 8/36
[52] U.S. Cl. ........................... 303/113.1; 303/DIG. 10
[58] Field of Search ................... 303/113.1, DIG. 10, 303/10–12, 119.1, 116.1, 116.2, 116.3, 116.4, 87; 137/884; 417/540

[56] References Cited

U.S. PATENT DOCUMENTS

| | | |
|---|---|---|
| 3,111,139 | 11/1963 | Beckett et al. ............ 137/884 |
| 3,538,947 | 11/1970 | Leiber . |
| 4,597,611 | 7/1986 | Nishimura et al. ......... 303/116.4 |
| 4,655,509 | 4/1987 | Ando et al. ............... 303/10 |
| 4,690,465 | 9/1987 | Takeda et al. ............ 303/116.4 |
| 4,705,324 | 11/1987 | Kervagoret . |
| 4,785,848 | 11/1988 | Leiber .................. 137/884 |
| 4,796,958 | 1/1989 | Brown, Jr. . |
| 4,840,544 | 6/1989 | Kuromitsu et al. . |
| 4,907,842 | 3/1990 | Goldfein . |
| 4,953,918 | 9/1990 | Hashida et al. .......... 303/116.4 |
| 4,955,673 | 9/1990 | Fukuda . |
| 5,011,238 | 4/1991 | Brown, Jr. . |
| 5,035,469 | 7/1991 | Geilen et al. ............ 303/DIG. 10 |
| 5,224,767 | 7/1993 | Kaneda .................. 303/119.2 |
| 5,236,253 | 8/1993 | Glasmacher ............. 303/116.4 |
| 5,244,262 | 9/1993 | Kehl et al. . |
| 5,403,077 | 4/1995 | Burgdorf et al. ......... 303/DIG. 10 |
| 5,460,438 | 10/1995 | Hellmann et al. ........ 303/DIG. 10 |
| 5,529,389 | 6/1996 | Sekiguchi .............. 303/DIG. 10 |
| 5,593,216 | 1/1997 | Hosoya et al. .......... 303/DIG. 10 |
| 5,599,074 | 2/1997 | Mori et al. ............ 303/DIG. 10 |

FOREIGN PATENT DOCUMENTS

| | | |
|---|---|---|
| 0051800 | 6/1985 | European Pat. Off. . |
| 2128168 | 12/1972 | Germany . |
| 4126959 | 2/1993 | Germany . |
| 4234013 | 4/1994 | Germany . |
| 4321695 | 1/1995 | Germany . |
| 91/16220 | 10/1991 | WIPO . |
| 91/16221 | 10/1991 | WIPO . |
| 92/04216 | 3/1992 | WIPO . |

*Primary Examiner*—Douglas C. Butler
*Attorney, Agent, or Firm*—Rader, Fishman, & Grauer PLLC

[57] ABSTRACT

An electrohydraulic unit for pressure control in automotive vehicle brake systems includes a housing, wherein channels and accommodating bores for inlet and outlet valves, pressure accumulator, pump, pump valves, pump drive and pressure fluid ports are incorporated, wherein accommodating bores for the inlet and outlet valves open vertically into a first housing plane, and accommodating bores for the pump and the suction channel of the pump are arranged in a second housing plane disposed in parallel to the first housing plane, and the suction channel is connected to an accommodating bore of the pressure accumulator which extends both in the area of the first and the second housing planes. Both the suction channel and the pressure channel are positioned on a joint axis in the second housing plane, and both the suction valve and the pressure valve are arranged in the second housing plane coaxially one behind the other in the area of the suction and pressure valves.

6 Claims, 1 Drawing Sheet

ELECTROHYDRAULIC UNIT

BACKGROUND OF THE INVENTION

The present invention relates to an electrohydraulic unit for pressure control in automotive vehicle brake systems.

German Patent Application No. 42 34 013 discloses an electrohydraulic unit for pressure control in automotive vehicle brake systems, wherein channels and accommodating bores are incorporated in a block-shaped housing. Electromagnetically operable inlet and outlet valves, pressure accumulators, pump pistons with pump valves and noise damping chambers are inserted into the accommodating bores. The inlet valves and the outlet valves are arranged in two valve rows which are aligned in parallel to each other. The accommodating bore for the pump extends between the two valve rows for the inlet and outlet valves. Another accommodating bore fore a noise damping chamber extends from the outside laterally to the accommodating bores for the inlet and outlet valves. Arranged in parallel to this accommodating bore side by side are further accommodating bores for the pressure accumulators. The selected parallel arrangement of the accommodating bores for the pressure accumulators and the damping chamber limits the maximum diameters of the pressure accumulators and the noise damping chambers due to the limited edge length of the housing, with the result that the volume absorption of the accommodating bores may be essentially changed by the bore depths. Besides, the edge length of the housing is determined not only by the side-by-side arrangement of the accommodating bores for the damping chambers and the pressure accumulators chosen but significantly depends on the radial extension of the pump. In the present state of the art construction, both the suction and the pressure valves are disposed within the pump piston, with the result of a relatively large overall size of the pump piston.

Therefore, an object of the present invention is to improve an electrohydraulic unit of the generic type to such effect that, with little effort and structure, a compact-size housing can be provided which especially involves a simple manufacture and best possible positioning of the individual structural components.

According to the present invention, this object is achieved for an electrohydraulic unit of the above-mentioned type by positioning both the suction channel and the pressure channel on a joint axis in the second housing plane, with the suction channel accommodating the suction valve of the pump and the pressure channel accommodating the pressure valve of the pump.

Further features and advantages of the present invention can be seen hereinbelow in the description of the subject matter of the present invention, making reference to the accompanying drawing.

BRIEF DESCRIPTION OF THE DRAWING

The single

DETAILED DESCRIPTION OF THE DRAWING

Figure 1:
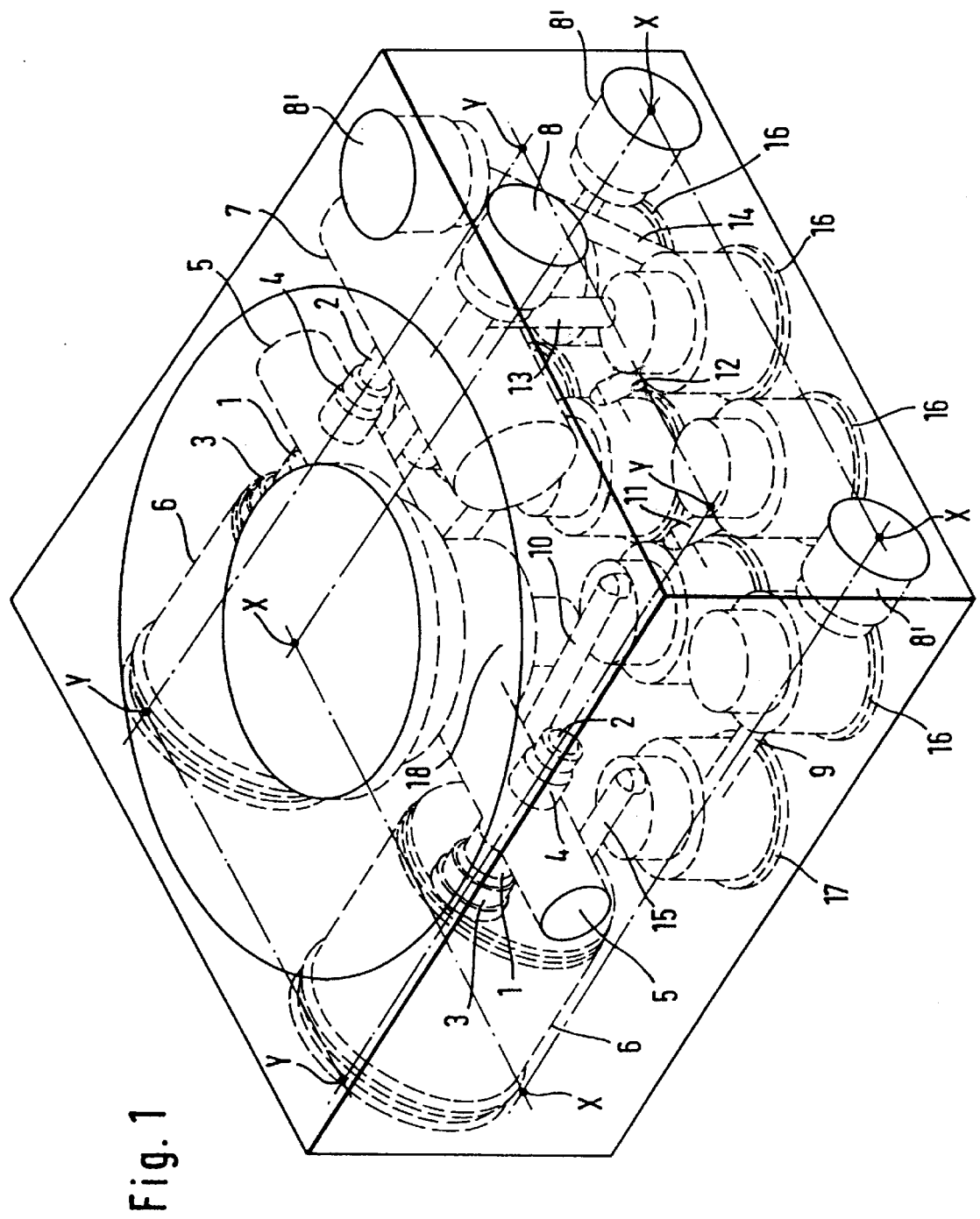
FIG. 1 shows an electrohydraulic unit in a three-dimensional representation on an enlarged scale.

The unit includes a generally block-shaped housing wherein channels 1, 2, 9–15 and accommodating bores 5–7, 16, 17 for the inlet and outlet valves, pressure accumulator, pump, pump valves, pump drive and pressure fluid ports are provided. In a first housing plane X, there are provided the accommodating bores 16, 17 for the inlet and outlet valves which open into the housing vertically relative to the housing plane X. The accommodating bores 5 of the pump and the suction channel 1 of the pump are arranged in a second housing plane Y disposed in parallel to the first housing plane X. The suction channel 1 is connected to an accommodating bore 6 of the pressure accumulator. The diameter of the accommodating bore 6 for the pressure accumulator extends in the lateral area of the first and second housing planes X, Y. According to the present invention, both the suction channel 1 and the pressure channel 2 extends along a joint channel axis in the second housing plane Y. The suction channel 1 accommodates the suction valve 3 and the pressure channel 2 comprises the pressure valve 4. Thus, both pump valves are arranged coaxially one behind the other on the channel axis of the suction and pressure channels 1, 2. The channel axis is at right angles to the axis of the accommodating bore 5 for the pump so that the accommodating bore 5 of the pump is interposed between the suction and pressure channels 1, 2. Inserting the suction and pressure valves 3, 4 into the associated channels 1, 2 permits a shorter length for the accommodating bore 5 of the pump because the pump piston has a shorter overall size due to the omission of the suction and pressure valves 3, 4. The suction and pressure valves 3, 4 are inserted into the suction and pressure channels 1, 2 from the direction of the accommodating bore 6 of the pressure accumulator. This achieves not only a relatively simple arrangement of bores in the housing but also a relatively unproblematic and easy-to-mount insertion of the pump valves in an order where, initially, the pressure valve 4 is slipped in through the suction channel 1 and transversely through the accommodating bore 5 into the pressure channel 2. Subsequently, the suction valve 3 is fitted. To position the suction and pressure valves 3, 4, preferably, stepped suction and pressure channels 1, 2 having different diameters are appropriate. According to the above representation, the pressure valve is adapted in its diameter to the small inside diameter of the pressure channel 1, and the suction valve 3 is adapted to the larger diameter of the suction channel 1. Additionally, this prevents interchanging both valves. Another advantage of the chosen arrangement and construction for the pressure fluid supply of the pump is achieved due to the relatively short suction channel 1 which favors the suction from the pressure accumulator. The pressure channel 2 opens into a noise damping chamber 7 which is aligned paraxially to the accommodating bore 5 of the pump. Chamber 7 is also positioned in the area of the second housing plane Y. The interspace in the housing confined by the accommodating bores 16, 17 of the inlet and outlet valves and the pressure fluid ports 8, 8' is optimally used by the chosen parallel arrangement of the noise damping chamber 7 in relation to the accommodating bore 5 of the pump. Thus, the noise damping chamber 7 extends above the valve rows of the inlet and outlet valves, with the result that a short pressure fluid connection can be established in a relatively simple manner through the channel 13 of the drawing to each one accommodating bore 16 of the inlet valves and the pressure fluid port 8 which leads to a braking pressure generator. Thus, the noise damping chamber 7 is arranged between the pressure channel 2 and a pressure fluid port 8 which opens paraxially to the pressure fluid channel 2 on the opposite side of the noise damping chamber 7. It can be seen from the drawing that beside the pressure fluid port 8 respectively leading to the braking pressure generator, further pressure fluid ports 8' are provided which are connected to the accommodating bores 16 of the inlet valves and lead to the wheel brakes. It is important in the arrangement shown that favorably (apart from the channels 11, 12, and 14) all other channels 1, 2, 9–15 extend preferably at right angles into the housing, which favors manufacture in conformity with the demands of automation. The pressure fluid port 8' respectively leading to the wheel brakes extends vertically and in a straight line through the respective accommodating bore 16 of the inlet valve until the accommodating bore 17 of the outlet valve. The associated channel is assigned reference numeral 9 and is disposed in the area of the housing plane X. Another channel 15 which preferably extends paraxially to the channel 9 provides a hydraulic connection to the accommodating bore 6 of the pressure accumulator outside the plane X. The provision of channel 15 is also rendered possible by a drilling operation in conformity with the demands of automation from the direction of the accommodating bore 6 and the accommodating bore 17. Thus, the channel 15 is positioned between the blind hole of the accommodating bore 17 and the accommodating bore 5 for the pump which extends vertically to the axis of the outlet valve. The second housing plane Y disposed above the first housing plane accommodates the pump drive (not shown in the drawing) within the accommodating bore 18 in a central surface position. Also, it is significant in the chosen arrangement of the above mentioned function elements that the configuration of almost all channels 1, 2, 9–15 as blind holes obviates the need for additional closure plugs in the channels. Due to the omission of through-bores, the function elements mounted into the accommodating bores 5, 6, 7, 16, 17 provide the closure concept of the hydraulic system in the housing. It should be noted in the drawing that the electrohydraulic unit is rated for use in a dual-circuit brake system with a diagonal brake circuit allotment in view of the number of accommodating bores or function elements used. This does not alter matters as mentioned above which are virtually directed only to the details and the essence of the present invention. For the sake of improved clarity of the individual connecting channels, the illustration of the second noise damping chamber 7 and the two further pressure fluid ports 8, 8' has been omitted in the drawing. However, the symmetrical arrangement of all components in the housing is similar.

I claim:

1. An electrohydraulic unit for pressure control in automotive vehicle brake systems which includes a housing wherein channels and accommodating bores for inlet and outlet valves, a pressure accumulator, a pump with a suction channel and a pressure channel, for a suction valve and a pressure valve, for a pump drive and pressure fluid ports are incorporated, wherein the accommodating bores for the inlet and outlet valves open vertically into a first housing plane and the accommodating bores for the pump and the suction channel of the pump are arranged in a second housing plane disposed in parallel to the first housing plane, and the suction channel is connected to the accommodating bore of the pressure accumulator which extends both in the area of the first and the second housing planes, wherein both the suction channel and the pressure channel are positioned on a joint axis in the second housing plane, and the suction channel accommodates the suction valve of the pump and the pressure channel accommodates the pressure valve of the pump.

2. An electrohydraulic unit as claimed in claim 1, wherein the accommodating bore of the pump is interposed between the suction and pressure channels.

3. An electrohydraulic unit as claimed in claim 1, wherein the suction and pressure valves are inserted into the suction and pressure channels from the direction of the accommodating bore of the pressure accumulator.

4. An electrohydraulic unit as claimed in claim 3, wherein the pressure valve is mounted into the pressure channel and, subsequently, the suction valve is mounted into the suction channel.

5. An electrohydraulic unit as claimed in claim 1, wherein the pressure channel opens into a noise damping chamber which is aligned paraxially to the accommodating bore of the pump and is positioned in the area of the second housing plane.

6. An electrohydraulic unit as claimed in claim 5, wherein the accommodating bore of the noise damping chamber is interposed between the pressure channel and a pressure fluid port which opens paraxially to the pressure channel on a side opposite to the noise damping chamber.

* * * * *